May 31, 1960   A. H. JONES ET AL   2,938,598
DUST COLLECTOR
Filed Feb. 14, 1958   3 Sheets-Sheet 3
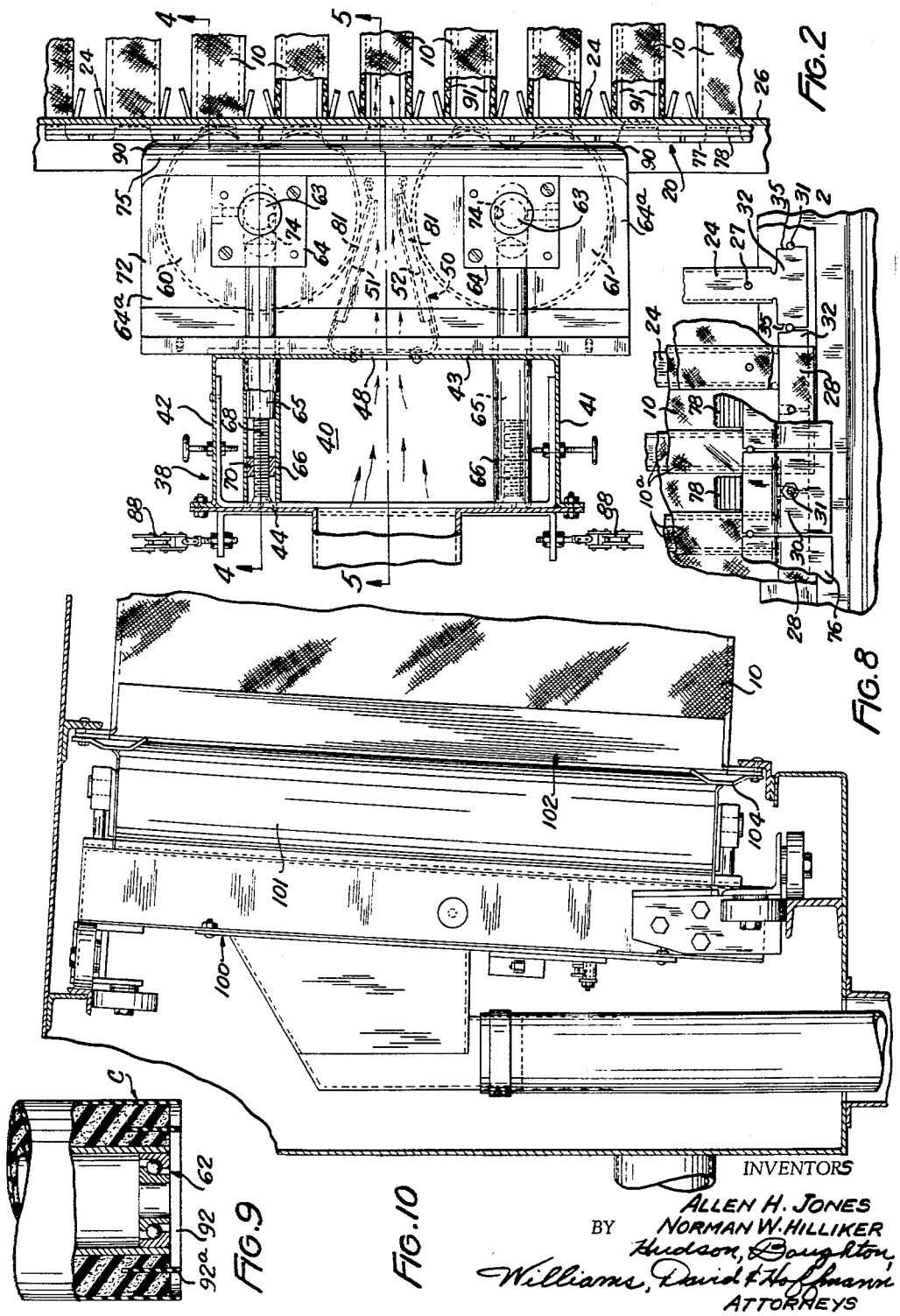
INVENTORS
ALLEN H. JONES
NORMAN W. HILLIKER
BY
Hudson, Boughton,
Williams, David & Hoffmann
ATTORNEYS

United States Patent Office 2,938,598
Patented May 31, 1960

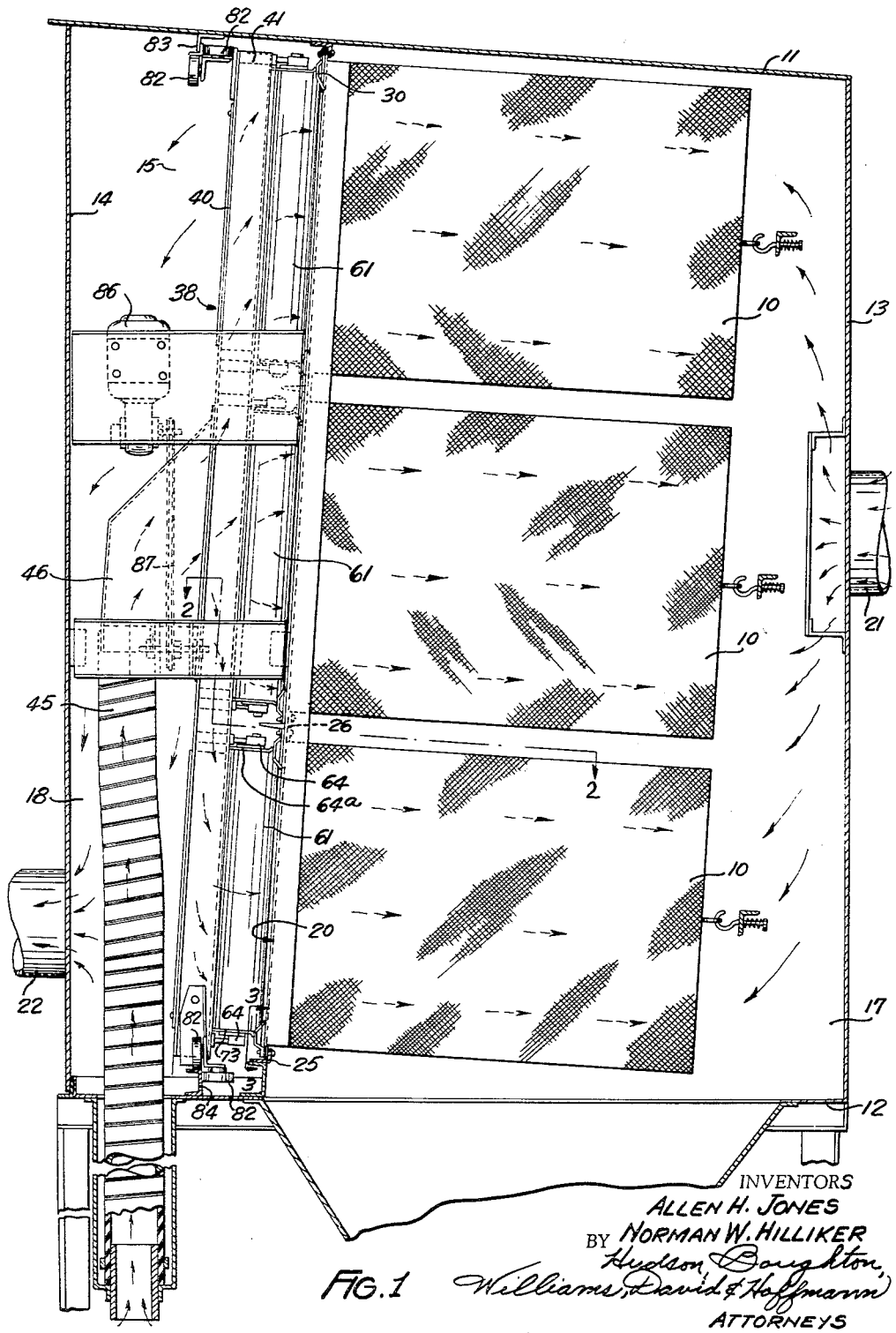

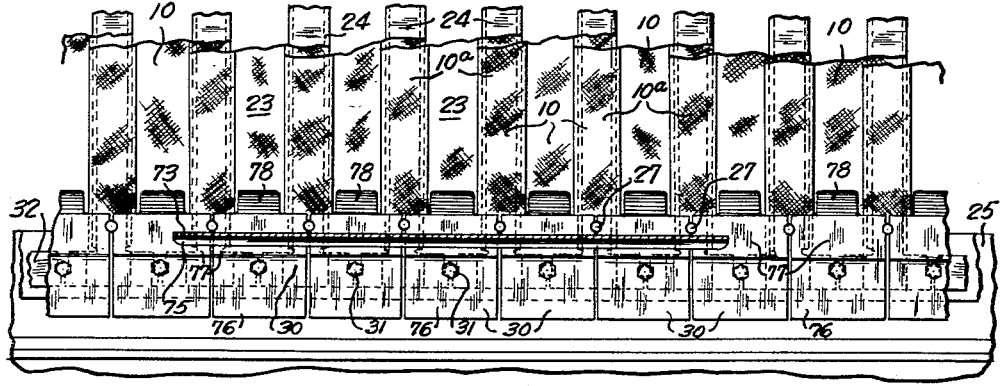
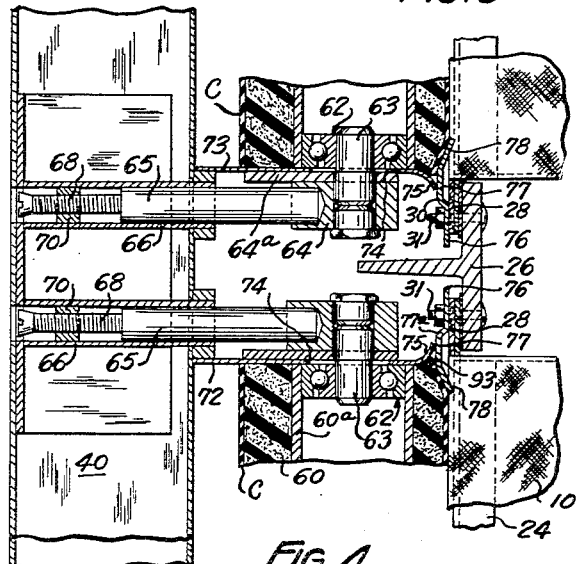
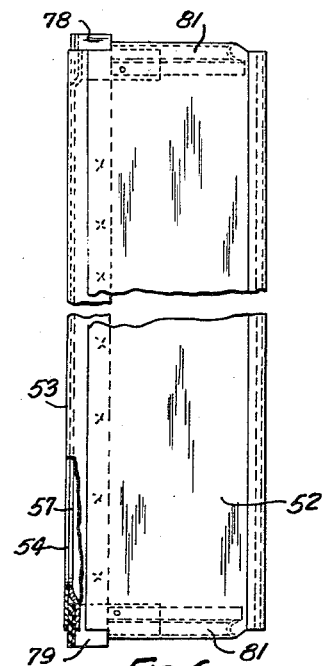
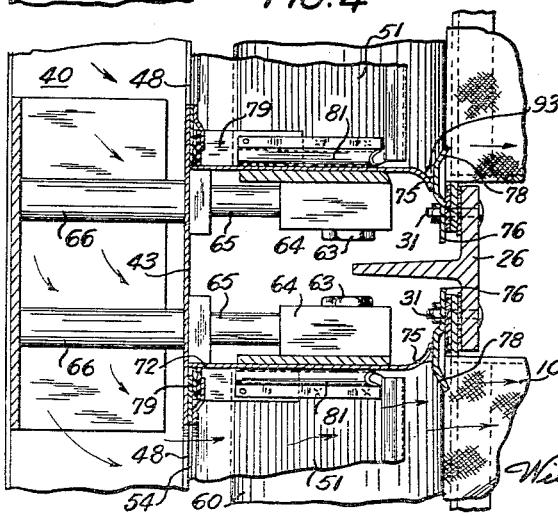

2,938,598
DUST COLLECTOR

Allen H. Jones, Chagrin Falls, and Norman W. Hilliker, Lakewood, Ohio, assignors to The W. W. Sly Manufacturing Company, Cleveland, Ohio, a corporation of Ohio Filed Feb. 14, 1958, Ser. No. 715,322

17 Claims. (Cl. 183—61)

This invention relates to improvements in dust collectors of the type wherein dust-laden air is caused to pass from the exteriors to the interiors of a plurality of filter bags supported by a dust wall to effect a cleaning of the air.

The general type of dust collector to which the invention relates is shown in Patent No. 2,695,681 to George A. Boesger and, as shown therein, the open ends of a plurality of filter bags located in a dust compartment are connected to a dust wall separating the dust compartment from a clean air compartment and the interiors of the bags are in communication with the clean air compartment through their open ends received in individual openings in the dust wall. The dust-laden air is introduced into the dust compartment, travels through the bags into the clean air compartment and is distributed from the clean air compartment to the desired point of use. Wire spacers are commonly mounted in the filter bags to prevent them from collapsing due to the lower pressure in the clean air compartment during the regular filter operation.

In order that dust collected on the outer sides of the filter bags shall not build up to such an extent as to materially interfere with the filtering operation, a traveler is mounted in the clean air compartment and is driven back and forth over the dust wall to register with the openings therein one after another and to supply reverse air from the traveler into the bags and through the bags from the interiors to the exteriors thereof. The reverse air causes the duct collected on the outer surfaces of the bags to be dislodged and to fall to the bottom of the dust compartment.

The filter bags are cleaned one at a time and after the cleaning of a filter bag it is desirable that the bag be blanked off from the clean air compartment for a period of time sufficient to enable the dust dislodged therefrom to fall to the bottom of the dust compartment. If the bag which has just been cleaned is immediately placed under suction, the dust therefrom may be redeposited on the bag defeating the beneficial effects of the cleaning operation. The traveler is therefore constructed so that the filter bag which has just been cleaned will remain blanked off from the clean air compartment while the adjacent filter bag is being cleaned and preferably while the next two filter bags are being cleaned as the traveler moves across the dust wall.

In one type of traveler, the reverse air is supplied to an air box on the traveler and is then led from the air box into the opening in registry with the traveler by means which include resiliently deformable rolls that engage the dust wall on opposite sides of the opening in registry with the traveler to seal off the opening and to blank off the openings adjacent to the one in registry with the traveler. As the traveler moves across the dust wall the rolls ride on the dust wall and are subject to being cut as they engage the ends of the openings in the dust wall. In the travelers of the prior art embodying rolls of the type described, the air has been led into the opening by a rigid nozzle disposed between the rolls and it has been possible for air to escape into the clean air compartment from between the rolls at the ends thereof.

The principal object of the present invention is to provide a new and improved dust collector of the type referred to in which the dust wall and traveler are constructed in a simplified manner and in a manner which improves the sealing around the opening in the dust wall in registry with the traveler to minimize leakage of the reverse air and also in a manner which improves the sealing effecting the blanking off of the openings adjacent the one in registry with the traveler.

Another object of the present invention is to provide a new and improved dust collector of the type described in which spaced resiliently deformable rolls of the traveler are not subject to being cut by the edges of the openings in the dust wall.

Another object of the present invention is to provide a new and improved dust collector of the type referred to in which reverse air is supplied to the interior of a filter bag by a traveler adapted to register with the open end of the filter bag and which includes a nozzle member positioned between two rolls for sealing off the sides of the opening in registry with the traveler and wherein the nozzle member includes movable portions urged into engagement with the rolls to effect a seal between the nozzle member and rolls to minimize leakage of air into the clean air compartment.

A further object of the present invention is to provide a new and improved dust collector of the type referred to in which the means for introducing air into the opening in registry with the traveler of the dust collector comprises spaced resiliently deformable rolls which engage the dust wall on opposite sides of the opening and in which sealing members extend between the rolls at their outer ends and have portions which engage the dust wall to effect a seal between the traveler and the dust wall at the opposite ends of the opening in registry with the traveler.

Still another object of the present invention is to provide a new and improved duct collector of the type described wherein leakage of reverse air for cleaning a filter bag or filter bags connected to a dust wall is prevented by spaced sponge rubber resiliently deformable rolls which engage the dust wall on opposite sides of the opening or openings to the filter bag or bags and by seal means which minimize the leakage of air past the ends of the rolls and from between the rolls, the seal means being so constructed and arranged that the operation of the dust collector is not impaired by sponge rubber particles which result from the wearing of the sponge rubber roll at the end seals therefor.

Yet another object of the present invention is to provide a new improved plate-like sealing member which is to engage a surface in a manner which effects a seal between the surface and the plate-like member, the surface extending generally normally to the plate-like member end and having portions somewhat offset from one another and across which the sealing member is moved in an endwise manner, and the plate-like member being so constructed and arranged that the offset portions do not interfere with the endwise movement of the sealing member.

A still further object of the present invention is to provide in a dust collector new and improved means for connecting the bags to the dust wall of the collector at the ends of elongated openings in the dust wall for receiving the bags, which means provides a sealing surface engageable with the sealing rolls and members of the traveler of the dust collector to deform the latter and provide a seal and constructed to prevent the rolls from being cut as they pass the edges of the openings and so that an individual bag may be readily removed from the dust wall.

A still further object of the present invention is to provide a new and improved dust collector in which a traveler for introducing reverse air into the filter bags connected to the dust wall of the dust collector forms a chamber about an opening in registry with the traveler to seal off the opening from the remainder of the clean air compartment, the traveler preferably including an air box and nozzle means for leading the air from the air box to the bag to be cleaned including spaced resiliently deformable rolls which form a part of the nozzle chamber and sealing means cooperating wtih the dust wall for minimizing leakage past the ends of the rolls.

Further objects and advantages of the present invention will be apparent from the following detailed description of the preferred embodiment thereof made with reference to the accompanying drawings forming a part of the present specification for all matter disclosed therein and in which:

Fig. 1 is a vertical sectional view of a three-tier dust collector embodying the present invention;

Fig. 2 is an enlarged fragmentary sectional view taken approximately along line 2—2 of Fig. 1;

Fig. 3 is a fragmentary sectional view taken approximately along line 3—3 of Fig. 1;

Figs. 4 and 5 are fragmentary vertical sectional views on lines 4—4 and 5—5, respectively, of Fig. 2 showing the details of construction of the traveler and dust wall.

Fig. 6 is an elevational view with parts broken away of a part of the traveler embodying the present invention;

Fig. 7 is a plan view of the part shown in Fig. 6;

Fig. 8 is a fragmentary view showing a detail of the mullion and dust clip construction;

Fig. 9 is a fragmentary view showing an alternative construction for the rolls of the traveler; and Fig. 10 is a fragmentary vertical sectional view of a single tier dust collector embodying the present invention.

Referring to the drawings, a three-tier dust collector is shown in section in Fig. 1. The dust collector shown in Fig. 1 comprises a housing 10 having top and bottom walls 11, 12 respectively, front and back walls 13, 14 respectively, and side walls 15, only one of which appears in the drawings, joining the front and back walls at the opposite ends thereof. The dust collector housing 10 is divided into a dust compartment 17 and a clean air compartment 18 by a dust wall 20 extending the height of the housing intermediate the front and back walls. The dust-laden air is introduced into the dust compartment 17 through an inlet connection 21 in the front wall of the housing.

Located in the dust compartment 17 are a plurality of filter bags 10 each having an open end connected to the dust wall 20 and in registry with an individual opening 23 therein which receives the open end of the bag so that the interiors of the bags 10 are in communication with the clean air compartment 18 through the corresponding opening in the dust wall. In the embodiment of Fig. 1 the bags 10 are arranged in three generally horizontal rows or tiers which are spaced vertically one from another.

The dust-laden air in the compartment 17 is drawn from the compartment 17 through the filter bags 10 into the compartment 18 by establishing a pressure differential between the compartments 17 and 18 and is withdrawn from the compartment 18 through an outlet 22 for distribution to its point of utilization. The air in passing from the compartment 17 to the compartment 18 passes from the outsides of the bags 10 to the interiors thereof and from the interiors of the bags through the openings 23 into the compartment 18.

The openings 23 in the dust wall for each tier of bags are defined by a plurality of parallel, horizontally spaced, vertical mullions 24 and end members extending between the sides 15 of the housing and between which the mullions 24 are supported. In the embodiment shown in Fig. 1, the mullions 24 for the lower row of bags 10 are supported between an end member 25 extending between the sides 15 of the housing adjacent the bottom 12 thereof, and an end member 26 extending between the sides of the housing 10 between the lower and middle rows of bags 10.

The open end of each filter bag 10 extends through its corresponding opening 23 in the dust wall and has side flaps 10a which are folded across the adjacent mullions and connected thereto by pins 27 spaced along the mullion; only one of the pins of each mullion appears in the drawings. The top and bottom of each bag are provided with tail portions 28 which pass through the opening 23 and are clamped against the dust wall by an individual bag or dust wall clip 30, hereinafter referred to as dust clips.

Figs. 3 and 4 show the details of the construction of the dust clips 30 and the manner of connecting the bags 10 to the dust wall 20. As is shown in Figs. 3, 4 and 8, the mullions 24 of the lower tier each have at their lower ends an anchor portion 32 which overlaps the lower end member 25 and which extends substantially into engagement with the portion 32 of the adjacent mullions. The lower dust clips 30 overlie the portions 32 of the adjacent mullions 24 and each dust clip is connected to the end member 25 by a bolt 31 which passes through the dust clip 30 and the end member 25.

The lower anchor portions 32 for the mullions 24, as described above, are disposed between the dust clip 30 and the end member 25, the dust clip 30 overlying the anchor portions of the adjacent mullions defining the opening for the bag secured by the particular dust clip 30. Each of the anchor portions 32 extends approximately to the center of the adjacent openings and is cut away at each end as shown at 35 to permit the passage of the bolts 31 of the overlying dust clips 30. The anchor portions 32 of the adjacent mullions 24 extend into substantially abutting relationship with each other adjacent the bolt 31 for the dust clip corresponding to the opening defined by the adjacent mullions and the mullions are clamped in place by the dust clips.

The dust clips 30 for connecting the tops of the bags 10 of the lower row to the dust wall are the same as the structure of the dust clips just described. The mullions 24 defining the opening for the lower rows of bags have upper anchor portions which are positioned intermediate upper dust clips 30 and the end member 26, which is a T-shaped angle that also forms the lower end member for the mullions of the intermediate tier, in the same manner as the portions 32 are positioned between the lower dust clips 30 and the member 25 and the upper dust clips 30 function in the same manner as the lower dust clips to clamp the upper portions of the bag to the dust wall. A fuller understanding of the structure of the upper dust clips 30 may be had by reference to Fig. 4 which shows the upper dust clips for the lower tier of and the lower dust clips for the intermediate tier of filter bags. These latter dust clips are the same as the dust clips for clamping the lower ends of the lower tier of bags to the dust wall.

When the air travels from the compartment 17 to the compartment 18 it passes from the exterior of the bags to the interior of the bags and from the interior of the bags to the compartment 18. This causes the dust in the air to be deposited upon the outsides of the bags 10 and in time sufficient dust will build up on the outsides of the bags to hinder the filtering action and the flow of air between the compartments.

The dust collector shown in Fig. 1 includes a traveler 38 which is mounted in the clean air chamber 18 for movement along the dust wall 20. In its movement along the dust wall 20 the traveler 38 registers one after another with the openings 23 in the dust wall and forces air into the filter bag connected to the opening in registry therewith to dislodge the dust from the outside of the bag.

As shown in Fig. 1 the traveler 38 comprises a vertical air box 40 which extends substantially the entire height of the chamber 18 and which includes side walls 41, 42 and front and rear walls 43, 44 respectively, the front wall facing the dust wall 20. The air box 40 is supplied with forced air from a flexible conduit 45 connected to an intake hood 46 opening into the rear side 44 of the air box 40 at approximately the midpoint of its length.

Opposite each tier of bags 10 the front wall 43 of the air box 40 has an elongated opening 48 which is opposed to and substantially the same in size as the openings in the dust wall 20. In other words, there are three elongated openings 48 disposed in vertical spaced relationship in the front wall 43. The opening 48 for the lower tier of bags 10 is shown in Figs. 2 and 5. Fig. 5 also shows the opening 48 for the intermediate tier of bags.

The air for cleaning the bags of each tier is led from the air box 40 to the opening of the tier to be cleaned by nozzle means interposed between each of the openings 48 and the dust wall 20. Each of the nozzle means is the same in construction and, therefore, only the nozzle means for leading the air from the lower opening 48 in the air box to the lower tier of bags will be described in detail.

Attached to the front 43 of the air box 80 adjacent the lower opening 48 is a nozzle member 50 shown separately in Fig. 6. The nozzle member 50 is a channel-shaped member having spaced side portions 51, 52 which extend forwardly from the forward wall 43 of the air box on opposite sides of the opening 48 and a bottom portion 53 which joins the side portions 51, 52 and which has an elongated opening 54 therein in registry with the lower opening 48 in the front of the air box.

The nozzle member 50 is a built-up member and the side portions 51, 52 thereof which are formed from separate sheet metal pieces are riveted to flanges 55, 56, respectively, formed integrally with a member forming the bottom portion of the channel of the nozzle member. The member forming the bottom portion of the channel is a light gauge flexible member and permits the sides 51, 52 to be pressed toward one another or spread. Preferably the bottom portion 53 has a reinforcing light gauge member 57 connected thereto about the opening 54.

The side portions 51, 52 of the nozzle member 50 extend forwardly from the front wall 43 of the air box between resiliently deformable rolls 60, 61 preferably comprised of foam rubber layers on tubular cores 60a, the foam rubber layers each having a covering C thereon, preferably of gum rubber. The axes of the rolls 60, 61 are parallel to the lengths of the elongated openings in the dust wall 20 and the rolls 60, 61 have an axial length greater than the openings 23 and are in engagement with the dust wall 20.

The rolls 60, 61 are each supported for rotation by upper and lower roller bearings 62 disposed within the upper and lower ends of the rolls, only the upper bearing for the roll 60 of the lower tier being shown in the drawing. One of the lower bearings, however, for the rolls of the intermediate tier is shown in Fig. 4 and is the same as the lower bearings for the rolls of the lower tier. The bearings 62 each have their inner race pressed on a pin 63 supported in a bearing block 64 mounted on the end of a support rod 65 extending outwardly from a respective tubular support member 66. The support rods 65 for supporting the upper bearing blocks 64 of the rolls 60, 61 for the lower tier are shown in detail in Figs. 2 and 4. While the support rods 65 for the corresponding lower bearing blocks 64 are not shown in detail, they are the same as the support rods for the lower bearings of the rolls for the intermediate tier, one of which is shown in Figs. 4 and 5. The support rods 65 are received in their respective tubular support members 66 and are adjustable inwardly and outwardly of the support member by operating a respective screw 68 disposed in each tubular support member 66 and accessible from the rear of the air box 40. The screws 68 thread through a corresponding nut 70 fixed within the respective support member 66. The screws 68 are adjusted to force the rolls 60, 61 into engagement with the dust wall 20 with sufficient pressure to effect a deformation of the rolls as can be seen by reference to Fig. 2. When the nozzle member 50 of the lower tier is positioned opposite one of the lower tier openings 23 in the dust wall 20, the roll 60 is pressed into engagement with the dust wall 20 and blanks off the next two openings on one side of the opening in registry with the nozzle member 50 and the roll 61 blanks off the next two openings on the other side of the opening in registry with the nozzle member 50. The upper and lower end portions of the rolls 60, 61 engage the dust clips 30 of the adjacent openings and a seal is effected between the dust clips 30 and the rolls 60, 61 to seal off the top and bottoms of the openings blanked by the rolls 60, 61 as will be described in more detail hereinafter.

The nozzle means interconnecting the air box 40 and the lower row of filter bags 10 also includes an upper plate-like resilient member 72 extending across the upper ends of the rolls 60, 61 and between the front wall of the air box 40 and the dust wall 20 to prevent the escape of air upwardly from between the rolls 60, 61 and a similar plate-like resilient member 73 extending across the lower ends of the rolls 60, 61. The lower member 73 is the same as the resilient plate-like member for the nozzle means of the intermediate tier shown in detail in the upper portion of Fig. 4. The lower plate-like resilient member 73 prevents the escape of air downwardly from the nozzle means connecting the air box and a particular one of the openings in the dust wall. In effect the rolls 60, 61 and the resilient plate-like members 72, 73 cooperate to form an open ended box which is closed by the dust wall 20 to form a chamber around the opening in registry with the nozzle member 50 and to separate the opening from the compartment 18. As is shown in Figs. 2 and 4, the upper plate-like member 72 is disposed between the upper bearing blocks 64 supporting the rolls 60, 61 and is provided with an elongated opening 74 through which the pin 63 for supporting the upper ball bearing 62 of the roll 60 passes. The opening 74 permits the roll 60 to be adjusted relative to the upper seal plate 72. The seal plate 72 is provided with another elongated opening, also designated by the reference numeral 74, for the pin which supports the upper bearing for the roll 61. Similarly, the lower seal plate 73 is disposed between the lower bearing block 64 and the rolls 60, 61 and has elongated openings therein, which permit the adjustment of the rolls 60, 61. The bearing blocks 64 each include a plate portion 64a which covers the opening 74 and furnishes support for the adjacent seal plate. In the illustrated embodiment, the plate portions of adjacent bearing blocks are shown as integral with each other.

The upper and lower seal plates 72, 73 extend to the dust clips 30, as shown in Figs. 3, 4 and 5, adjacent the upper and lower ends of the openings 23 of the lower tier and each plate has a resilient deflected portion 75 which engages the adjacent clips 30 and by reason of its resiliency effects a seal therebetween. As is shown in the drawings, the top and bottom sides of the plates 72, 73, which are the major sides of the plates as compared to the sides forming the peripheral edges of the plates, extend generally normal to the adjacent surface of each of the clips 30 and that the peripheral edges of the plates along which the portions 75 thereof lie extend along the adjacent surfaces of the clips.

As is shown in detail in Figs. 3, 4 and 5, the dust clips 30 are formed with a first planar portion 76 extending parallel to the dust wall 20 and through which the bolts 31 for connecting the dust clips to the dust wall pass, a second planar portion 77 parallel to and offset from the first portion toward the air box 38 and joined to the first portion by a portion 77a. The deflected portions 75 of the lower seal plates engage the portions 77 of the adjacent dust clips as well as the end portions of the rolls 60, 61. Furthermore, each dust clip has a deflected portion 78 relatively narrow as compared to the portions 77, 76 and extending into the adjacent opening 23. The deflected portions 78 extend substantially the entire width of their corresponding openings 23.

It can now be seen that the reverse air from the air box passes through the lower elongated opening 48, and the nozzle member 50 to the lower opening 23 in registry with the traveler 38. The side portions 51, 52 of the nozzle member are flexibly connected to the bottom portion of the nozzle member and since the reverse air is under a greater pressure than the air in compartment 18, it urges the side portions 51, 52 into sealing engagement with the adjacent rolls 60, 61 to prevent the leakage of reverse air between the nozzle member and the rolls 60, 61.

The nozzle member 50 is provided with sealing means at each end which cooperates with the adjacent one of the seal plates 72, 73 to effect a seal between the nozzle member and the seal plates. This sealing means comprises a double sealing member 79 at each end of the nozzle member 50. The sealing members 79 extend along and beyond the adjacent end of the bottom portion 53 and along and beyond the part of the adjacent ends of the side portions 51, 52 next to the bottom portion. The double sealing members 79 are each received between the reinforcing member 57 and the bottom portion 53, the reinforcing member 57 being deflected at its opposite ends so that the sealing members may be disposed between the member 57 and the bottom portion. The ends of the side portions 51, 52 forwardly of the sealing members 79 are rolled as indicated at 81 to provide cylindrical surfaces for engaging the seal plate adjacent and forwardly of the sealing members 79 and the ends of the sealing members are received between the adjacent rolled back edge of the side portions and the side portions proper of the nozzle member 50.

The rolled edges 81 provide sealing between the nozzle member 50 and the adjacent seal plate without having a sharp edge in proximity to the adjacent one of the rolls 60, 61. During operation, the rolls 60, 61 rotate in one or the other of two opposite directions and because of their deformable nature, tend to grab any sharp edge adjacent the peripheries of the rolls. The rolled edges 81 do not present a surface which the rolls tend to grab. While the rolls chiefly tend to grab an edge toward which they are rotating, it will be noted that the rolled edges 81 extend both forwardly and rearwardly from the point of engagement by the adjacent roll since the rolls rotate in both directions during operation. Attention is also directed to the fact that the longitudinal front sides of the side portions 51, 52 are disposed forwardly of and clear of the rolls 60, 61.

The nozzle means for connecting the air box 40 to the other tiers of bags 10 is the same as the nozzle means described for the lower tier and each includes a nozzle member 50, resiliently deformable rolls 60, 61, upper and lower seal plates 72, 73 which sealingly cooperate with the adjacent rolls 60, 61, nozzle member 50 and the adjacent upper and lower dust clips 30 for clamping the corresponding bags to the dust wall and the description thereof wil not be repeated. Suffice it to say that the rolls 60, 61 are supported for adjustment toward and away from the dust wall 20 by support rods 65 which support the bearing blocks 64 for the rolls of the nozzle means and which are constructed in the same manner as that described for the upper tier. The corresponding parts of the other nozzle means, not mentioned above, have also been given the same reference numerals as the corresponding parts of the lower nozzle means.

The traveler 38 is movable along the dust wall 20 to cause the nozzle member 50 to register with the openings 23 in the dust wall one after another and is supported for movement by upper and lower pairs of wheels 82 mounted on the upper and lower ends of the air box 40 and cooperating with upper and lower angles 83, 84. The angles 83, 84 extend between the sides 15 of the housing 10 and the traveler 38 is moved along the angles 83, 84 by the operation of a motor 86 supported by the housing 15 and operatively connected to the traveler 38 through a chain drive 87 including a chain 88 having its opposite ends connected to the air box 40. Operation of the motor 86 drives the chain 88 to move the traveler 38 along the dust wall 20.

In operation the traveler 38 is moved along the dust wall 20 to register with the openings 23 therein one after another and air is supplied to the air box 40 and is delivered from the air box 40 through the nozzle member 50 into the opening or openings 23 in registry with the traveler and then into and through the bag connected to the corresponding opening to dislodge the dust collected on the outer surfaces thereof. The flow of reverse air can be induced by the suction in the dirty air compartment caused by pump means removing air from the outlet 25. It will be noted that the upper and lower end portions of the rolls 60, 61 ride on the surfaces 77 of the adjacent dust clips 30 and effect sealing engagement therebetween and that the upper and lower seal plates 72, 73 also engage the surfaces 77 of adjacent upper and lower dust clips 30 immediately outwardly of the deformable rolls to effect a seal therebetween and prevent the escape of air from the chamber defined by the rolls 60, 61, the nozzle member 50, and the upper and lower seal plates 72, 73 of each nozzle means.

When the traveler is moving across the dust wall, the upper and lower seal plates are moved endwise across the sealing surface defined by the adjacent row of dust clips. As a practical matter, the individual dust clips 30 will not, as a rule, define a continuous smooth surface since certain ones of the clips will be offset with respect to the adjacent clip and present a side edge to the endwise moving seal plate. It has been found that if the leading corner (which is the corner formed by the peripheral edge of the plate lying along the clips 30 and an intersecting peripheral edge) of the deflected portion 75 of each seal plate is rounded or curved as indicated at 90 in Fig. 2, the deflected portion will ride over the edges presented by the dust clips which are offset. The traveler 38 moves in both directions across the dust wall and therefore, each of the corners adjacent the dust wall of each deflected portion is rounded or curved in the manner described.

The deflected portions 78 of the dust clips 30 prevent the rolls 60, 61 from being cut as they ride across the openings 23. In addition to protecting the rolls 60, 61 the deflected portions 78 engage the inner spacers conventionally used inside the bags 10 and prevent their working outwardly of the bags into a position which would interfere with the traveler 38. Such conventional spacers are shown only in Fig. 2 and have been given the reference numeral 91.

The rolls 60, 61 preferably engage the corresponding seal plates 72, 73 throughout their diameter to prevent leakage past the ends of the rolls. It has been found, however, that when the deformable layer on the cores 60a, 61a of the rolls is of foam rubber, the particles which result as the rubber wears are sticky and tend to cling to the periphery of the rolls and will sometimes foul the operation of the traveler until they are removed. If desired, the rolls 60, 61 can each be provided, as shown in Fig. 9, with an outer peripheral skirt 92 which engages the adjacent seal plate to effect the seal and an inner skirt 92a. The skirt 92 can be formed by extending the cover C of the roll beyond the end of the roll and the inner skirt is formed of the same material as the cover C and inserted into the foam rubber.

It is to be noted that the screws 68 are adjusted so that the rolls 60, 61 are deformed against the dust clips 30 and so that a portion 93 of each roll is preferably forced into the space between the deflected portion of the adjacent seal plate and the cooperating dust clip.

In describing the invention, it has been noted that the absolute pressure of the air in the air box 40 will force the side portions 51, 52 of the nozzle member 50 into engagement with the adjacent rolls. The side portions can be spring-biased to engage the adjacent rolls and preferably some bias is provided to urge the side portions toward the adjacent one of the rolls to aid in initially effecting the seal. In the described nozzle, the light gauge member forming the bottom portion 53 and its flanges 55, 56 tend to assume the U-shaped configuration of Fig. 7. When the nozzle member 50 is assembled in the apparatus, the side portions 51, 52 are moved toward each other from their position in Fig. 7, as is shown in Fig. 2, and a bias results which together with the absolute air pressure inside the nozzle member 50 urges the side portions 51, 52 into engagement with the rolls 60, 61.

Fig. 10 shows the present invention embodied in a dust collector having a single row of bags 10. As can be seen by reference to Fig. 10, a traveler 100 is provided which is of substantially the same construction as the traveler 38 of the first-described embodiment except that it is for a single tier rather than three tires and, therefore, only one set of resiliently deformable rolls is provided, only one of the rolls appearing in the drawing and is designated by the reference numeral 101. The traveler is supported for movement along a dust wall 102 of the dust collector in the same manner as the traveler of the embodiment of Fig. 1 and the bags 10 of the collector are connected to the dust wall by dust clips 104 which are of the same construction as the dust clips 30.

While the traveler of the present invention has been described as registering with one opening, the minimization of leakage air enables the traveler to be readily used to clean a plurality of bags at one time and when the claims recite that an opening is in registry with the traveler or the nozzle thereof, it is to be understood that this is intended to cover a structure when two or more openings are in registry with the traveler or nozzle thereof.

While a preferred embodiment of the present invention has been described in considerable detail, it is hereby our intention to cover all constructions and modifications and arrangements which fall within the ability of those skilled in the art and the scope and spirit of the appended claims.

Having thus described our invention what we claim is:

1. In a dust filter having a dust compartment, a clean air compartment, a dust wall separating the compartments, a plurality of spaced, parallel, side-by-side filter bags on one side of the wall, said bags having open ends connected to said dust wall and communicating with the other side of the wall through individual openings in the dust wall, and a traveler on said other side of the wall movable across the wall sequentially to register with the openings and to force air into the opening in registry therewith, said traveler comprising spaced resiliently deformable rolls engaging said dust wall on opposite sides of the opening in registry therewith and extending beyond the opposite ends of said openings, the improvement which comprises means for effecting a seal between said rolls and said dust wall comprising means adjacent said openings at their one ends defining a surface extending across said dust wall outwardly of corresponding ends of said openings and engaging the periphery of and deforming the adjacent end portions of said rolls, and a flat member at said one end of each of said elongated openings and having a flat side engaging said rolls when opposite the opening and extending from said surface into the opening.

2. In a dust filter having a dust compartment, a clean air compartment, a dust wall separating the compartments, a plurality of spaced, parallel, side-by-side filter bags on one side of the wall, said bags having open ends connected to said dust wall and communicating with the other side of the wall through individual openings in the dust wall, and a traveler on said other side of the wall movable across the wall sequentially to register with the openings and to force air into the opening in registry therewith, said traveler comprising spaced resiliently deformable rolls engaging said dust wall on opposite sides of the opening in registry therewith and extending beyond the opposite ends of said openings, the improvement which comprises means for effecting a seal between said rolls and said dust wall comprising means adjacent said openings at their one ends defining a surface extending across said dust wall and engaging the periphery of and deforming the adjacent end portions of said rolls, and a flat member at said one end of each of said elongated openings engaging said rolls when opposite the opening and extending from said surface into the opening, said means defining said surface and said flat member being provided by a plurality of clips arranged in end-to-end relationship and detachably connected to the dust wall, there being one of said clips adjacent each of said openings at its said one end and said clips each having a portion extending parallel to said wall adjacent said one end of the adjacent opening and defining a part of said surface and a portion extending into the adjacent opening and providing said member.

3. In a dust collector having a dust wall separating clean air and dust compartments, a plurality of open ended side-by-side filter bags having their open ends connected to the dust wall in registry with individual openings in the wall, and a traveler movable along said dust wall to register sequentially with the openings therein, said traveler including means for conducting air to an opening registering with said traveler comprising spaced seal plates extending generally perpendicularly to said dust wall adjacent first opposite sides of the opening in registry with the traveler and engaging said dust wall along lines parallel to the line of movement of said traveler across said wall, first and second spaced resiliently deformable rolls extending between said plates and engageable with said dust wall on second opposite sides of said opening in registry with the traveler, means supporting said rolls a distance from said dust wall less than the radii of said rolls, said seal plates each having resilient portions sealingly engaging said dust wall, and wall means spaced from said dust wall and extending between said rolls and said seal plates and providing with said dust wall, rolls and seal plates a closed chamber and including air inlet means for introducing air into the chamber.

4. In a dust collector as defined in claim 3 wherein said wall means comprises a generally U-shaped member having a base portion extending parallel to said dust wall between said rolls and leg portions extending from the opposite sides of said base portion inwardly between said rolls, said leg portions being movably connected to said base portion and the outer sides thereof engaging said rolls.

5. In a dust collector as defined in claim 3 wherein the portions of said seal plates adjacent said dust wall are deflected outwardly from the plane of the respective seal plate in a direction away from the rolls and the corners of the seal plates adjacent the dust wall are rounded.

6. In a dust collector having a dust wall separating clean air and dust compartments, a plurality of open ended side-by-side filter bags having their open ends connected to the dust wall in registry with individual openings in the wall, and a traveler movable along said dust wall to register sequentially with the openings therein, said traveler including means for conducting air to an opening registering with said traveler comprising spaced seal plates extending generally perpendicularly to said dust wall adjacent first opposite sides of the opening in registry with the traveler and engaging said dust wall along lines parallel to the line of movement of said traveler across said wall, first and second spaced resiliently deformable rotatable rolls extending between said plates and engageable with said dust wall on second opposite sides of said opening in registry with the traveler, means supporting said rolls a distance from said dust wall less than the radii of said rolls, said seal plates each having resilient portions sealingly engaging said dust wall with said portions being deflected outwardly from the plane of the respective seal plate in a direction away from the rolls and the corners of the seal plate adjacent said dust wall being rounded, wall means spaced from said dust wall and extending between said rolls and said seal plates and providing with said dust wall, rolls and seal plates a closed chamber and including air inlet means for introducing air into the chamber, each of said openings having a clip member at each of said first opposite sides for clamping a portion of the bag to the dust wall, and means connecting said clips to the dust wall, each of said clips comprising a portion extending parallel to the dust wall substantially into engagement with the corresponding portion of the adjacent clips and engaged by said deflected portion of the adjacent one of said seal plates.

7. In a dust collector having a dust wall separating clean air and dust compartments, a plurality of open ended side-by-side filter bags having their open ends connected to the dust wall in registry with individual openings in the wall, and a traveler movable along said dust wall to register sequentially with the openings therein, said traveler including means for conducting air to an opening registering with said traveler comprising spaced seal plates extending generally perpendicularly to said dust wall adjacent first opposite sides of the opening in registry with the traveler and engaging said dust wall along lines parallel to the line of movement of said traveler across said wall, first and second spaced resiliently deformable rotatable rolls extending between said plates and engageable with said dust wall on second opposite sides of said opening in registry with the traveler, means supporting said rolls a distance from said dust wall less than the radii of said rolls, said seal plates each having resilient portions sealingly engaging said dust wall, wall means spaced from said dust wall and extending between said rolls and said seal plates and providing with said dust wall, rolls and seal plates a closed chamber and including air inlet means for introducing air into the chamber, each of said openings having a clip member adjacent each of said first opposite sides for clamping a portion of the bag to the dust wall, and means detachably connecting said clips to the dust wall, each of said clips comprising a first portion extending parallel to the dust wall substantially into engagement with the first portions of the adjacent clips and a second portion narrower than said first portion and extending into the adjacent opening, the end portions of said rolls engaging said second portions of the adjacent clips and being deformed thereby and said seal plates engaging the first portions of the adjacent clips.

8. In a dust collector as defined in claim 7 wherein said wall means comprises a generally U-shaped member having a base portion extending between said rolls parallel to said dust wall and leg portions extending from the opposite sides of said base portion inwardly between said rolls, said leg portions being movably connected to said base portion and the outer sides thereof engaging said rolls.

9. In a dust collector, a traveler for delivering in sequence reverse air under pressure to a plurality of side-by-side openings in a dust wall and movable across the dust wall to register sequentially with the openings, said traveler comprising an air box having a front wall parallel to and facing said dust wall, first and second resiliently deformable rolls intermediate said front wall and said dust wall, the axes of said rolls being parallel and the peripheries of said rolls engaging the dust wall on opposite sides of the opening in registry with the traveler, means carried by said air box rotatably supporting said rolls, first and second seal plates extending across the opposite ends respectively of said rolls and each having a resilient edge in sealing engagement with said dust wall, said seal plates moving endwise relative to said wall on movement of said traveler, the ends of said rolls sealingly engaging said seal plates, a channel member extending parallel to said openings and having a bottom portion connected to said front wall and first and second side portions extending from opposite sides of said bottom portion inwardly between said rolls, said side portions being movably connected to said bottom portion and biased toward the adjacent roll to engage the outer sides thereof with the adjacent roll, said bottom portion and front wall having aligned openings therein.

10. In a dust collector as defined in claim 9 wherein said bottom portion of the channel member has means sealingly engaging said seal plates and the ends of the side portions adjacent said seal plates and said rolls have edges rolled inwardly to present a cylindrical surface to the adjacent seal plate.

11. In a dust collector as defined in claim 9 wherein means supporting said rolls comprises support rods between which said rolls are mounted and means connecting said support rods to said air box for adjustment toward and away from said dust wall.

12. In a dust collector, a traveler for delivering air under pressure to one of a plurality of side-by-side elongated openings in a dust wall separating a clean air compartment and a dust compartment, said traveler being supported in said clean air compartment for movement across the dust wall to register with the openings therein one after another and comprising spaced rolls engaging said dust wall for sealing the opposite sides of one of said openings and means for introducing air between said rolls comprising a channel member on the side of said rolls opposite said dust wall, said channel member extending parallel to said rolls for substantially the length thereof and having spaced side portions extending inwardly between said rolls and a bottom portion joining said side portions, said side portions being movably connected to said bottom portion and the outer sides thereof engaging the periphery of said rolls and said bottom portion including means for introducing air between said rolls at a pressure higher than the pressure in said clean air compartment.

13. In a dust collector, a dust wall having openings therein defined by a plurality of spaced parallel mullions and first and second end members extending perpendicular to said mullions at the opposite ends thereof, a bag disposed in the opening defined by each pair of adjacent mullions, the open end of said bag having side portions connected to the adjacent mullions and tail portions adjacent said end members, a clip member disposed between each pair of adjacent mullions at each of the opposite ends of the mullions, said clip members having a first portion overlying the adjacent end member and extending substantially into engagement with the first portions of the adjacent clips and second portions extending into the adjacent opening, said tail portions being disposed between said clips and said end members, and means detachably connecting said clips to the adjacent one of said end members.

14. In a dust collector, the structure as defined in claim 13 wherein said clips each has a portion intermediate the said first and second portions thereof providing a sealing surface extending parallel to said dust wall.

15. In a dust collector the structure as defined in claim 13 wherein said mullions have anchor portions disposed between said clips and said end members with the anchor portions of each mullion extending substantially to the centerlines of the openings adjacent the mullion.

16. In a dust collector having a dust wall to which a plurality of side-by-side filter bags are connected, a plurality of side-by-side clips connecting the bags to the dust wall and a traveler movable across said dust wall along said clips to supply sequentially reverse air to said bags, a seal plate carried by said traveler and engageable with said clips to effect a seal between said traveler and clips, said seal plate extending generally perpendicularly to said dust wall and moving endwise across said clips on movement of said traveler, the portion of said seal plate adjacent said clips being resiliently deflected from the plane of the plate and the leading corner of the deflected portion adjacent said dust wall being rounded.

17. In combination, means providing a sealing surface, a plate-like sealing member movable endwise across said sealing surface, said member having major flat sides lying primarily in planes perpendicular to said sealing surface and a first peripheral edge disposed adjacent to and extending along said sealing surface and a second peripheral edge extending along the leading end of said sealing member as it moves along said surface and intersecting said first edge to define a leading corner of said member and being resiliently deflected by said surface along a line parallel to its line of movement so as to engage said surface adjacent the said first peripheral edge of said member, said surface having portions offset from adjacent portions toward the sealing member and presenting an edge to said sealing member as it moves toward the offset portion, and the leading corner of said sealing member adjacent said surface being rounded whereby the offset portion is first engaged by the rounded edge of the member.

References Cited in the file of this patent
UNITED STATES PATENTS

| | | |
|---|---|---|
| 407,948 | Case | July 30, 1889 |
| 1,830,097 | Dollinger | Nov. 3, 1931 |
| 2,507,335 | Donohue | May 9, 1950 |
| 2,583,039 | Boesger | Jan. 22, 1952 |
| 2,695,681 | Boesger | Nov. 30, 1954 |
| 2,867,289 | Sare | Jan. 6, 1959 |